(12) United States Patent
Wilson

(10) Patent No.: US 7,815,776 B2
(45) Date of Patent: Oct. 19, 2010

(54) DESALINIZATION BY EVAPORATION FROM CAPILLARY MATERIAL

(76) Inventor: George E. Wilson, 2363 NE. Stephanie Ct., Hillsboro, OR (US) 97124

( * ) Notice: Subject to any disclaimer, the term of this patent is extended or adjusted under 35 U.S.C. 154(b) by 1147 days.

(21) Appl. No.: 10/584,976

(22) PCT Filed: Jan. 11, 2005

(86) PCT No.: PCT/US2005/000877

§ 371 (c)(1),
(2), (4) Date: Jun. 29, 2006

(87) PCT Pub. No.: WO2005/070512

PCT Pub. Date: Aug. 4, 2005

(65) Prior Publication Data

US 2009/0173617 A1 Jul. 9, 2009

Related U.S. Application Data

(60) Provisional application No. 60/536,103, filed on Jan. 12, 2004, provisional application No. 60/536,285, filed on Jan. 13, 2004.

(51) Int. Cl.
*B01D 1/28* (2006.01)
*B01D 3/02* (2006.01)
*C02F 1/04* (2006.01)

(52) U.S. Cl. .................. 202/176; 159/24.1; 159/46; 159/906; 159/DIG. 27; 159/DIG. 28; 159/DIG. 41; 202/182; 202/202; 202/235

(58) Field of Classification Search ............... 159/24.1, 159/46, 906, DIG. 27, DIG. 28, DIG. 41; 202/83, 176, 182, 202, 235; 203/10, 22, 203/24, 26, 27, 100, DIG. 8, DIG. 17
See application file for complete search history.

(56) References Cited

U.S. PATENT DOCUMENTS

| | | | |
|---|---|---|---|
| 2,530,376 A | 11/1950 | Castle et al. | |
| 2,807,912 A | 10/1957 | Bjorksten | |
| 3,875,926 A | 4/1975 | Frank | |
| 4,118,285 A | 10/1978 | Yeh | |
| 4,267,021 A | 5/1981 | Speros et al. | |
| 4,326,923 A * | 4/1982 | Mortenson | 202/185.5 |
| 4,342,624 A * | 8/1982 | Chute et al. | 202/176 |
| 4,475,988 A | 10/1984 | Tsumura et al. | |
| 4,478,685 A | 10/1984 | Mortenson | |
| 4,585,523 A | 4/1986 | Giddings | |
| 4,698,135 A | 10/1987 | Raab | |
| 5,043,061 A * | 8/1991 | Inagaki | 210/151 |
| 5,133,837 A | 7/1992 | Elmore et al. | |
| 5,139,620 A | 8/1992 | Elmore et al. | |
| 5,628,879 A | 5/1997 | Woodruff | |
| 5,645,694 A | 7/1997 | Stewart et al. | |
| 5,665,208 A * | 9/1997 | Giesselmann | 203/12 |
| 6,440,275 B1 | 8/2002 | Domen | |
| 6,663,750 B1 | 12/2003 | Coon | |
| 2003/0159809 A1* | 8/2003 | Valenzuela | 165/104.26 |
| 2008/0110191 A1* | 5/2008 | Lowenstein et al. | 62/271 |

OTHER PUBLICATIONS

Yeh, et al., "Separation of Liquid Mixtures by Capillary Distillation," *Desalination* 81:129-160 (1991).

* cited by examiner

*Primary Examiner*—Virginia Manoharan
(74) *Attorney, Agent, or Firm*—Klarquist Sparkman, LLP

(57) ABSTRACT

A method and an apparatus for desalinizing raw water are disclosed. The method can include wicking the raw water into a porous material by capillary action and heating the raw water in the porous material with a heating element to form water vapor. The water vapor then can be condensed to form purified water. The apparatus can include a chamber for holding raw water, a heating element, a sheet of porous material and a chamber for collecting water vapor evaporated from the raw water in the porous material.

6 Claims, 3 Drawing Sheets

DESALINIZATION BY EVAPORATION FROM CAPILLARY MATERIAL

CROSS REFERENCE TO RELATED APPLICATIONS

This application is the U.S. National Stage of International Application No. PCT/US2005/000877, filed Jan. 11, 2005, which was published in English under PCT Article 21(2), which in turn claims the benefit of U.S. Provisional Application No. 60/536,103, filed Jan. 12, 2004, and U.S. Provisional Application No. 60/536,285, filed Jan. 13, 2004. These applications are incorporated herein by reference in their entirety.

FIELD

This disclosure concerns methods and apparatus for carrying out desalinization.

BACKGROUND

Access to clean drinking water is essential to human health. Unfortunately, a large portion of the world population lives in developing areas where clean drinking water is not available. However, many of these same areas have access to a virtually unlimited supply of salt water, e.g. from nearby oceans. This salt water can be desalinized to provide drinking water.

Conventional land-based desalinization techniques rely heavily on electricity, however, which is another commodity in short supply in the developing world. Conventional desalination techniques also have the disadvantage of generating large quantities of waste brine. It can be difficult and costly to dispose of waste brine.

One conventional process for desalinization uses a series of effects. Each effect is a separate chamber at an incrementally lower pressure and temperature than the last. Raw water is passed into the first effect and heated to boiling. The steam resulting from the evaporation within the first effect is then used to heat raw water in the second effect. This process is repeated and the steam is eventually condensed into a stream of desalinized water.

Conventional desalinization processes have been implemented in a variety of locations. Such processes have been used, for example, to provide drinking water in coastal areas with low rainfall. Such processes also have been used on ocean vessels. Conventional shipboard desalinization systems typically are sized for supplying sufficient water for the crew and any passengers over the expected length of a voyage. These systems require substantial maintenance and cannot be operated beyond their design capacities in a cost-effective manner.

There is a great need for simple desalinization and purification systems that use readily available and inexpensive sources of energy, that can be operated cost effectively on a large scale and that can be adapted for on-ship installation. Since waste brine disposal requirements often make desalinization cost-prohibitive, there also is a need for desalinization systems that do not produce waste brine in significant amounts.

SUMMARY

Described herein are methods and apparatus for desalinizing water by evaporation from capillary material. Some of these methods and apparatus also include vapor recompression. In some embodiments, capillary material is draped over the surface of tubes. The capillary material absorbs water from a raw water source. Steam flows through the tubes and heats the capillary material causing the raw water to evaporate from the capillary material. The residual salt collects on the capillary material and can be removed with the capillary material. The steam generated by evaporating the raw water is recompressed and fed into the tubes that supply heat to the capillary material. The steam can be supplied with sufficient vapor flow velocity to enhance heat transfer.

According to one implementation, the capillary-desalinization system is configured for on-ship operation, i.e. the system is transported to different locations on board a vessel. The on-ship embodiments can be transported to locations near sources of raw salt water and to other locations in need of desalinized water. This mobility can reduce overall construction costs.

Some embodiments of capillary desalinization are substantially all-thermal, e.g. they rely chiefly on thermal energy produced by one or more boilers. In general, such substantially all-thermal embodiments do not require electrical energy as a primary energy source, although some electrical energy may be used in monitoring and process control. Such systems are especially well suited for on-ship installations. Bunker fuel, such as Bunker C fuel, is an especially advantageous fuel type for powering boilers used in on-ship desalinization processes.

DETAILED DESCRIPTION

This disclosure concerns a novel and advantageous approach to desalinization. This approach will be referred to herein as "capillary desalinization." Several embodiments incorporating capillary desalinization are included in this disclosure. Some of these embodiments include vapor recompression.

The terms "capillary material" and "porous material" are used interchangeably throughout this disclosure to refer to material that wicks raw water by capillary action. The singular forms "a", "an," and "the" refer to one or more than one, unless the context clearly dictates otherwise. The term "or" refers to a single element of stated alternative elements or a combination of two or more elements. The term "comprises" means "includes."

I. Some Embodiments

Figure 1:
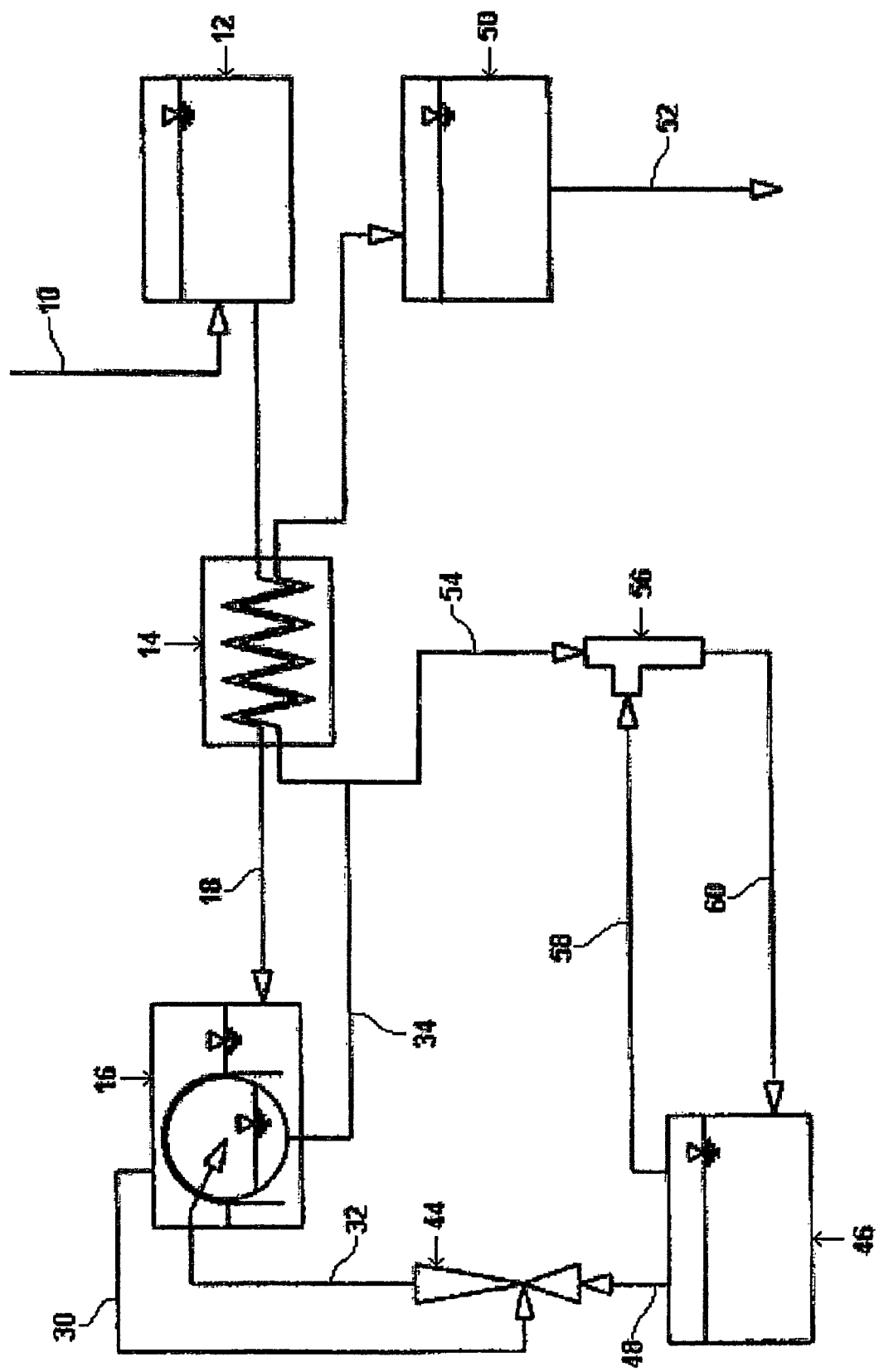
FIG. 1 is a schematic illustrating one embodiment of a system designed to carry out a substantially all-thermal process of water purification by capillary desalinization.

FIG. 1 illustrates a first embodiment of an apparatus for performing substantially all-thermal capillary desalinization with vapor recompression. A raw-water stream 10 first enters a raw-water reservoir 12. The raw water is then fed into a heat exchanger 14. The heat exchanger 14 preferably is a counter-current type and may be of any configuration, such as plate or tubular. After receiving some heat, the raw water then flows into a capillary-desalinization unit 16 via a raw-water inlet 18.

Figure 2:
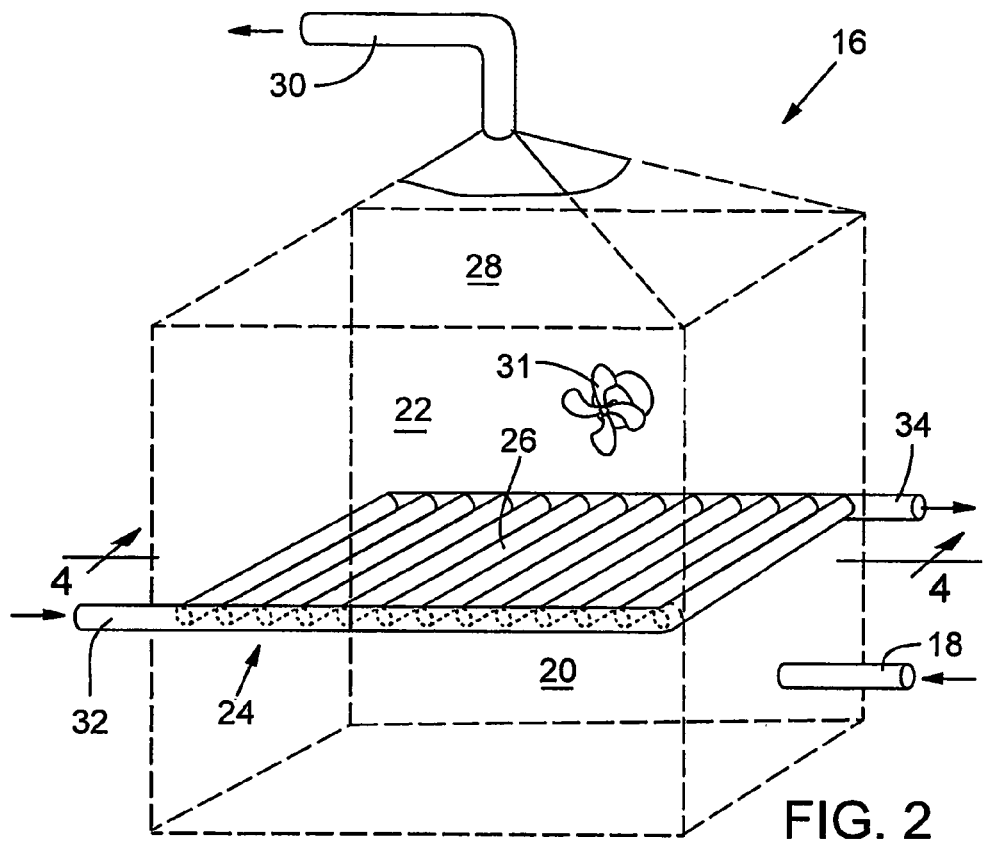
FIG. 2 is an isometric view of one embodiment of a capillary desalinization unit.

FIG. 2 is an isometric view of the capillary-desalinization unit 16. The internal components are illustrated within a conceptual enclosure, including a lower chamber 20 and an upper chamber 22. The lower chamber 20 and the upper chamber 22 are separated by an evaporation/condensation portion 24. The evaporation/condensation portion 24 comprises at least one tube 26, and typically comprises a bank of parallel tubes having interconnected ends as shown. The upper chamber 22 can have a tapered portion 28 that leads to an upper chamber outlet 30. The upper chamber 22 also can have a fan 31 or other circulating device for distributing vapor throughout the upper chamber 22 and thereby maintaining the vapor phase in a turbulent state. The effect of maintaining the vapor phase in a turbulent state is discussed below in greater detail.

Figure 3:
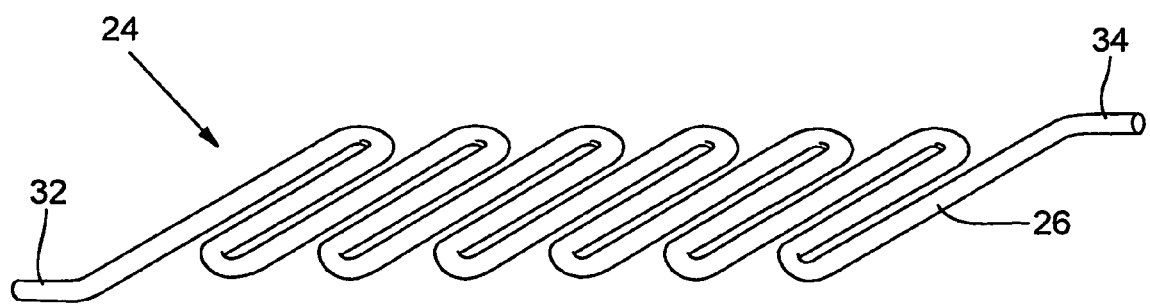
FIG. 3 is an isometric view of an alternative embodiment of the evaporation/condensation portion shown in FIG. 2.

In the evaporation/condensation portion 24, each tube 26 is connected at one end to a tube inlet 32 carrying compressed vapor and connected at the opposite end to a tube outlet 34 carrying condensate. In alternate embodiments, the evaporation/condensation portion 24 can be partially or completely serpentine with fewer connections to the tube inlet 32 carrying compressed vapor and to the tube outlet 34 carrying condensate than in the embodiment illustrated in FIG. 2. FIG. 3 shows an embodiment of the evaporation/condensation portion 24 in which the tubes 26 are connected in a fully serpentine configuration.

Figure 4:
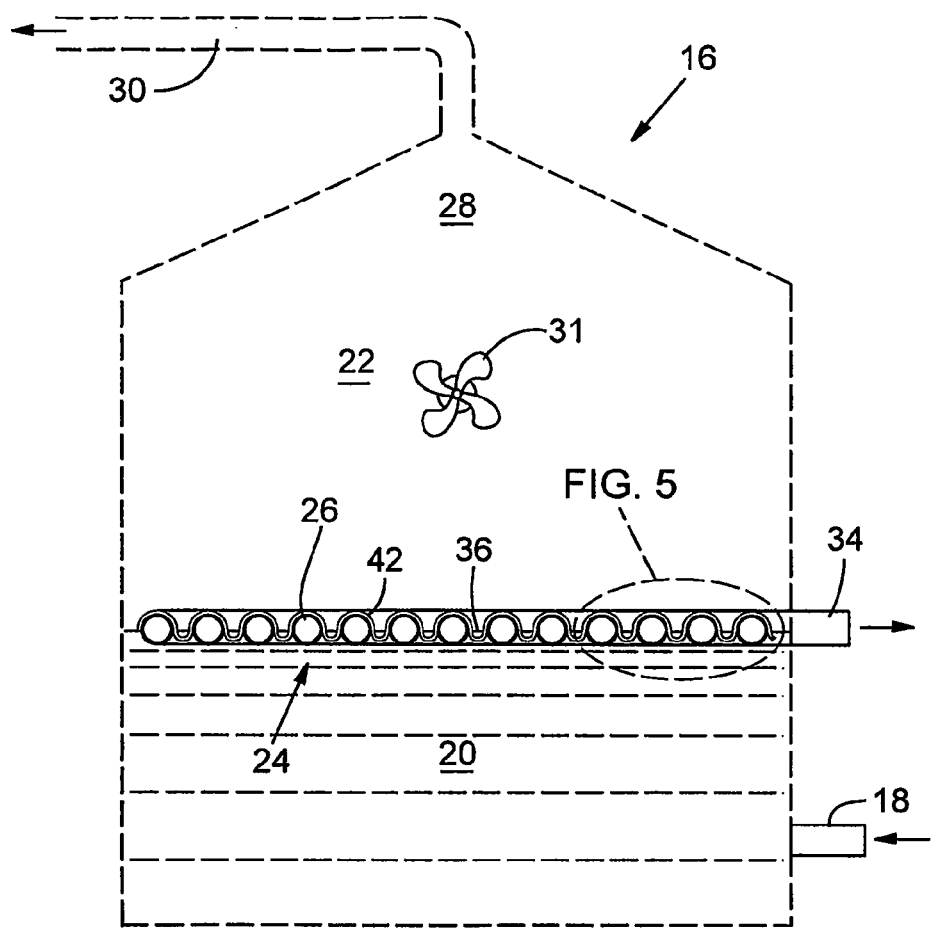
FIG. 4 is a cross-sectional profile view of the capillary-desalinization unit illustrated in FIG. 2, taken at the line 4-4.
Figure 5:
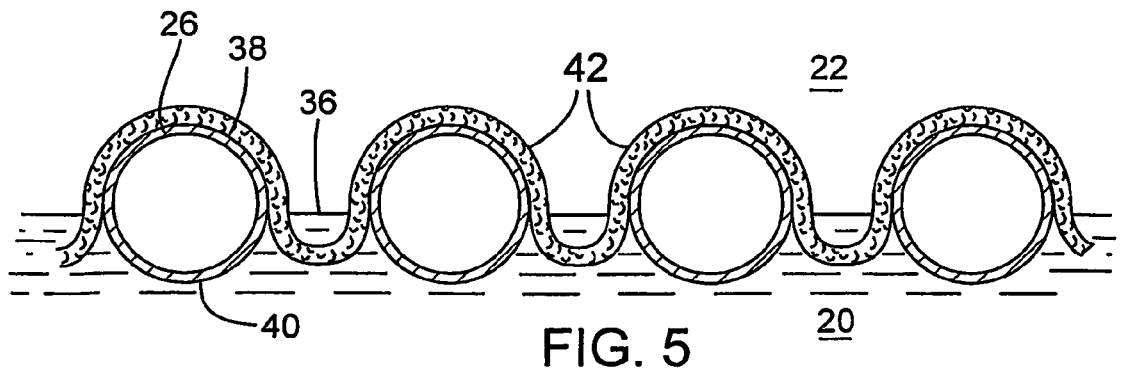
FIG. 5 is a detailed cross-sectional profile view of a portion of the evaporation/condensation portion of the capillary-desalinization unit illustrated in FIG. 4.

FIG. 4 is a cross-sectional profile view of the capillary-desalinization unit 16 looking in the direction of arrows 4. FIG. 5 is a detailed view of a portion 5 of the evaporation/condensation portion 24. During operation, raw water enters the lower chamber 20 via the raw-water inlet 18. The raw water in the lower chamber 20 has a raw-water surface 36. Each tube 26 has an upper surface 38 and a lower surface 40. The upper surface 38 is covered by a sheet of capillary material 42. The lower surface 40 can be in contact with the raw-water surface 36. The capillary material 42 contacts the raw-water surface 36 on either side of each tube 26. Weirs or float valves (not shown) can be used to maintain the raw water inside the lower chamber 20 at the desired level.

As shown in FIG. 1, the upper chamber outlet 30 routes steam from the upper chamber 22 into a vapor-recompression unit 44. Within the vapor-recompression unit 44, the steam from the upper chamber 22 is mixed with steam from a boiler 46. The steam from the boiler 46 enters the vapor-recompression unit 44 via a vapor-recompression steam inlet 48. The mixture of steam from the upper chamber 22 and steam from the boiler 46 flows through the tube inlet 32 into the tubes 26. The steam within the tubes 26 condenses as it travels through the tubes 26. The pressure inside the tubes 26 is elevated above the pressure of the upper chamber 22 and is maintained by condensate overflow weirs (not shown) set at appropriate elevations. The condensate flows through the tube outlet 34. A portion of the condensate is routed through the heat exchanger 14 and then into a pure water storage tank 50. A pure water outlet 52 draws pure water from the pure water storage tank 50 for end use. The remainder of the condensate from the tube outlet 34 flows through an injector condensate inlet 54 and into an injector 56. The injector 56 pulls water though the injector condensate inlet 54 by injecting it with steam through an injector steam inlet 58. This steam is generated by the boiler 46. The hot condensate from the injector condensate inlet 54 and the steam from the injector steam inlet 58 flow through a boiler feed 60 to the boiler 46. In alternative embodiments, the injector condensate inlet 54 can be routed from the pure water storage tank 50.

II. Capillary Desalinization in Detail

Capillary desalinization is superior to conventional desalinization techniques in several respects. First, scaling on the evaporative surfaces is greatly reduced. Second, no brine stream is produced. Third, the coefficient of heat transfer is particularly high, thereby reducing the amount of evaporative surface area required to achieve a given desalinization rate. Fourth, the crystallized salt accumulates on the capillary evaporative surface, rather than accumulating in the raw water and thereby necessitating continuous discharge of a brine stream. This is useful, in part, because waste brine streams often are subject to stringent disposal regulations. Capillary-desalinization systems also require less maintenance than conventional desalinization systems, partly due to the decreased scaling. Rather than producing waste brine, capillary desalinization can result in a substantially solid salt residue in the form of a salt cake, which is easily recovered and can be sold as a separate commodity.

Capillary desalinization takes advantage of the various properties of capillary material to achieve efficient desalinization of water. One of these properties is the ability of capillary material to wick water. In the present system, the capillary material wicks raw water up and away from the raw-water source. In experimental trials, it was discovered that a large portion of the salt residue remains isolated on the capillary material after evaporation. This salt residue builds up on the surface of the capillary material and eventually forms a porous matrix of salt crystals.

Several advantages stem from the isolation of the salt residue from the raw-water source. In conventional desalinization systems, the salinity of the raw water gradually increases, causing a corresponding increase in its boiling point and a greater energy demand. The increased salt concentration characteristic of conventional systems also facilitates the formation of precipitates of calcium and other minerals on the heat-exchange surfaces (i.e. scaling). In contrast, capillary-desalinization systems are not prone to scaling since there is no increase in the salinity of the raw water and the crystallized salt deposits form on the capillary material, which is separate from the heat-exchange surfaces.

In order to provide for continuous operation, conventional desalinization systems typically remove the salt in a continuously flowing waste-brine stream. Disposing of the waste brine causes serious environmental concerns, since plants and animals are harmed by changes in the salinity of their environment. Dumping waste brine also wastes energy, because the waste-brine stream flows directly from the heated raw-water source.

Unlike conventional desalinization systems, no waste brine is generated by capillary desalinization. The salt is removed in crystal form from the surface of the capillary material. To achieve continuous operation, the evaporation/condensation portion can be divided into removable trays. These trays can be removed during operation to allow salt crystal removal. Alternatively, the capillary material itself can be removed and cleaned periodically during operation. The salt crystals can be removed from the capillary material by a variety of processes, such as soaking or scraping. While one tray of tubes or section of capillary material is removed, another can remain in the unit. In this way, no disruption in operation associated with salt removal occurs.

Another advantageous property of capillary material is its high ratio of effective surface area to projected plane area.

Evaporation rate is dependent on surface area. The water-air interface of a simple pool is limited to the surface of the pool. In contrast, capillary material soaked with water has a water-air interface along the network of microscopic surfaces within the capillary material. Since capillary material increases the water's surface area, the evaporation rate also increases. Capillary-desalinization systems therefore can be made smaller and more efficient than their conventional counterparts.

The evaporation rate of the raw water can be further increased by circulating the vapor phase around the capillary material. Maintaining the vapor phase in a mixed turbulent state reduces the vapor barrier and thereby enhances the heat transfer rate across the capillary material. The evaporation rate with the vapor phase in a turbulent state can be many times higher than the evaporation rate without circulation of the vapor phase. In the embodiment illustrated in FIG. 2, circulation of the vapor phase is achieved by the fan 31.

The capillary material used in a capillary-desalinization system can be any material that absorbs water and is reasonably durable when soaked with water at high temperatures. One effective material is cellulosic toweling, such as CHIX® toweling, manufactured by Chicopee of Dayton, N.J.

Evaporating water absorbs a large amount of heat. Since the evaporation rate across capillary material is particularly high, it is advantageous to apply heat directly to the capillary material to prevent it from cooling. This heat can be applied with a variety of heating elements, such as plate or tubular heat exchangers. In some embodiments, the heat is provided by steam condensing in a metal tube adjacent to the capillary material. In the embodiment illustrated in FIG. 4, the tubes 26 are in contact with the capillary material 42 and with the raw water pool below the capillary material 42. The heat from the lower surface 40 of the tubes 26 flows into the raw water pool and heats it to near boiling. The heat from the upper surface 38 of the tubes 26 flows into the capillary material 42 and evaporates the constituent water. This configuration applies heat at or near the raw-water surface 36, where it can be used most efficiently.

III. Vapor Recompression in Detail

Some embodiments of capillary desalinization incorporate vapor recompression. In these embodiments, heat from the steam generated by evaporating the raw water is reused in the process. For example, the steam generated by evaporating the raw water can be mixed with steam from the boiler and used to help evaporate the raw water.

In the embodiment illustrated in FIG. 2, the steam from the upper chamber 22 is combined with steam from the boiler 46 in the vapor-recompression unit 44. This is necessary because the tube inlet 32 is at higher pressure than the upper chamber 22. This pressure difference helps to maintain heat flow in the system. Keeping the tube inlet 32 and the tubes 26 at high pressure increases the amount of heat transferred to the capillary material 42. The recompression of steam from the upper chamber 22 causes a vacuum that pulls the contents of the upper chamber 22 through the upper chamber outlet 30 and into the vapor-recompression unit 44. This vacuum also pulls raw water into the capillary-desalinization unit 16 from the raw-water reservoir 12. The upper chamber 22, including the tapered portion 28, must be strong enough to withstand this vacuum.

Vapor recompression can be accomplished by a variety of devices. Mechanical vapor recompression can be achieved by compressors, such as centrifugal compressors. These compressors often are powered by electricity. In other implementations, vapor recompression is accomplished without electrical power by using a thermocompressor, such as a steam-jet ejector. Ejectors work by injecting a high-pressure motive fluid, such as steam, into the fluid to be compressed. The motive fluid accelerates the fluid to be compressed and the velocity of the combined stream is then converted back into pressure.

Vapor recompression saves a significant amount of energy. It is estimated that the energy required to evaporate a specific amount of water while recovering the heat of condensation by vapor recompression is only 5 to 10 percent of the energy that would otherwise be required to convert an equivalent amount of water into steam. The energy consumed in a continuous-flow capillary-desalinization system employing vapor recompression is roughly equivalent to that consumed by a staged evaporator system with eight to ten effects. Naturally, the use of vapor recompression rather than multiple effects makes the overall system smaller and less expensive. The total energy costs for the system are estimated at $0.50 per 1000 gallons of purified water when using Bunker C fuel, which is discussed in greater detail below.

In substantially all-thermal embodiments, additional cost savings can be achieved by optimizing the ratio of low-pressure steam from the capillary-desalinization unit to high-pressure steam from the boiler. If this ratio is low, the output steam can be compressed to a higher pressure. Thus, less evaporative surface area will be required because the condensation temperature and the rate of heat transfer within the capillary-desalinization unit will be relatively high. This is a high operational cost, low capital cost scenario. Conversely, if the ratio is low, the output steam will be compressed to a lower pressure. More evaporative surface area will be required because the condensation temperature and the rate of heat transfer within the capillary-desalinization unit will be relatively low. This is a high capital cost, low operation cost scenario. Since the primary cost of desalinization is the cost of the fuel, the latter scenario typically reduces overall costs.

IV. Some Applications

Capillary desalinization, as described herein, is well-suited for a variety of applications. The disclosed methods and apparatus can readily be modified to accommodate these applications.

Many parts of the world experience regular shortages of fresh water. At the same time, other parts of the world may experience an abundance of fresh water. Unfortunately, it is difficult and costly to transport large amounts of water between distant locations. It therefore is necessary to generate fresh water near locations in need of fresh water. Capillary desalinization can be implemented near locations in need of fresh water even if the locations do not have the infrastructure to support other desalinization processes.

Capillary-desalinization systems can be made substantially all-thermal by incorporating injectors and ejectors. Thermal energy (i.e. heat) can be generated by burning oil, coal, or other raw materials. In remote areas, such raw materials often are more readily available than electricity. Substantially all-thermal capillary-desalinization systems therefore can be installed in extremely remote areas.

Capillary-desalinization systems, particularly substantially all-thermal systems, also are well-suited for on-ship installations. Such installations can be designed to provide only enough fresh water for the crew and passengers or, alternatively, can be designed to generate enough fresh water to supply communities on land. In the latter scenario, the on-ship capillary-desalinization system would essentially dominate the ship. Such a "desalinization ship" could travel quickly to areas in need of fresh water. The ship could be docked on the shoreline of such areas while the fresh water is piped to communities on land.

Installing a capillary-desalinization system on an ocean vessel calls for certain modifications to the apparatus and methods. For example, some on-ship embodiments can be powered by the vessel's existing boiler and fuel systems. On-ship installation also allows the salt-encrusted capillary material to be cleaned by regularly dipping it in a rinse tank containing continuously replenished sea water. Once the encrusted salt crystals have been dissolved off the capillary material, the capillary material can be placed back into the capillary-desalinization unit.

The boiler in on-ship capillary-desalinization systems can be powered by a variety of fuel-types. It has been discovered, however, that bunker fuel, such as Bunker C fuel, is especially well-suited for this application. Bunker fuel comprises the heavy residual material left over after refining of crude oil. It often is diluted with solvents to reduce its viscosity. For on-ship applications, the fuel required to operate the system, which can also be the vessel's fuel, can be transported to the vessel by conventional "make-up" tanker ships. Based on the cost of bunker fuel, the efficiency of typical vessel boilers, and the efficiency of the capillary-desalinization system, the overall system can be operated cost effectively.

Having illustrated and described the principles of the invention in exemplary embodiments, it should be apparent to those skilled in the art that the illustrative embodiments can be modified in arrangement and detail without departing from such principles. In view of the many possible embodiments to which the principles of the invention can be applied, it should be understood that the illustrative embodiments are intended to teach these principles and are not intended to be a limitation on the scope of the invention. I therefore claim as my invention all that comes within the scope and spirit of the following claims and their equivalents.

I claim:

1. An apparatus for evaporating raw water and collecting the resulting water vapor, comprising:
   a lower chamber for holding raw water;
   a heating element extending over the lower chamber and positioned above or partially submersed in the raw water;
   a sheet of porous material extending over the heating element and having a submersed portion in contact with the raw water and a non-submersed portion above the raw water, where the heating element is in contact with the non-submersed portion of the porous material;
   an upper chamber above the sheet of porous material for collecting water vapor evaporated from raw water in the porous material; and
   a vapor-recompression device,
   wherein the heating element comprises a conduit that receives water vapor collected in the upper chamber and transfers heat from the water vapor to the raw water in the porous material, and the vapor-recompression device pressurizes the water vapor before the water vapor enters the conduit.

2. The apparatus of claim 1, further comprising a heat exchanger for transferring heat between purified water formed by condensing the water vapor and make-up raw water traveling to the lower chamber.

3. The apparatus of claim 1, wherein the sheet of porous material and/or the heating element is/are removable from the apparatus.

4. The apparatus of claim 1, further comprising a circulation device for maintaining the water vapor in the upper chamber in a turbulent condition.

5. The apparatus of claim 1, wherein the vapor-recompression device pressurizes the water vapor by mixing the water vapor with steam from a boiler.

6. The apparatus of claim 5, further comprising the boiler and an injector that adds make-up water to the boiler by mixing the make-up water with steam from the boiler.

* * * * *